United States Patent [19]

Brindoepke et al.

[11] Patent Number: 5,344,897
[45] Date of Patent: Sep. 6, 1994

[54] LIQUID COATING AGENT BASED ON TRANSESTERIFIED, MODIFIED EPOXY RESINS AND BLOCKED POLYAMINES

[75] Inventors: Gerhard Brindoepke, Sulzbach; Uwe Kubillus, Wiesbaden; Helmut Plum, Taunusstein, all of Fed. Rep. of Germany

[73] Assignee: Hoechst AG, Fed. Rep. of Germany

[21] Appl. No.: 146,573

[22] Filed: Oct. 29, 1993

Related U.S. Application Data

[63] Continuation of Ser. No. 777,677, Oct. 15, 1991, abandoned.

[30] Foreign Application Priority Data

Oct. 16, 1990 [DE] Fed. Rep. of Germany ..... 40327565

[51] Int. Cl.$^5$ ............... C08G 59/14; C08G 59/16
[52] U.S. Cl. .................... 525/526; 525/528; 525/529; 525/530; 525/531; 525/532; 525/533; 528/100; 528/107; 528/110; 528/111; 528/113; 528/119; 528/120; 528/123; 427/386; 156/330
[58] Field of Search ........ 525/528, 529, 533, 530–532, 525/526; 528/100, 107, 110, 111, 113, 120, 119, 123; 427/386; 156/330

[56] References Cited

U.S. PATENT DOCUMENTS

| 4,016,141 | 4/1977 | Ritz et al. | 528/125 |
| 4,495,335 | 1/1985 | Geist et al. | 525/438 |
| 4,775,735 | 10/1988 | Goel | 528/90 |

Primary Examiner—Frederick Krass
Attorney, Agent, or Firm—Bierman and Muserlian

[57] ABSTRACT

Liquid coating agent based on a polymer containing acetoacetate groups and a polyamine in the form of the corresponding aldimine or ketimine, the polymer containing acetoacetate groups being obtained by reaction of a polyepoxide with water, an amine or a hydroxycarboxylic acid and subsequent esterification or transesterification with acetoacetic acid. These liquid coating agents are particularly suitable as binders in two-component automobile repair fillers or as two-component primers.

12 Claims, No Drawings

LIQUID COATING AGENT BASED ON TRANSESTERIFIED, MODIFIED EPOXY RESINS AND BLOCKED POLYAMINES

PRIOR APPLICATION

This application is a continuation of U.S. patent application Ser. No. 777,677, filed Oct. 15, 1991, now abandoned.

Coating agents which contain a polymer containing acetoacetate groups as the binder component and a polyamine in the form of the corresponding aldimine or ketimine as the crosslinking agent are already known from EP-0,199,087 and U.S. Pat. No. 3,668,183. During hardening of these two-component systems, the acetoacetate groups react with the polyamines to form enamine groups (Journal of Paint Technology, Volume 46, No. 591, pages 70-76 and pages 76-81). Known polymers containing acetoacetate groups are those based on polyols, polythiols or polyamines (U.S. Pat. No. 3,668,183). The polymers containing acetoacetate groups which are described in EP 199,087 are those which are obtained by addition polymerization of unsaturated monomers, at least one monomer containing a hydroxyl group. This hydroxyl group in the finished polymer is then converted into the acetoacetate group.

The present invention relates to liquid coating agents based on a polymer containing acetoacetate groups and a polyamine in the form of the corresponding aldimine or ketimine, the polymer containing acetoacetate groups being obtained by reaction of a polyepoxide with water, an amine or a hydroxycarboxylic acid and subsequent esterification or transesterification with acetoacetic acid derivatives.

Examples of suitable epoxides are mono- and/or polyepoxides. These epoxide compounds in this context can be either saturated or unsaturated and aliphatic, cycloaliphatic, aromatic or heterocyclic, and contain hydroxyl groups. They can furthermore contain those substituents which cause no troublesome side reactions under the reaction conditions, for example alkyl or aryl substituents, ether groupings and the like.

These epoxide compounds are preferably polyglycidyl ethers based on polyhydric, preferably dihydric, alcohols, phenols, hydrogenation products of these phenols and/or novolaks (reaction products of mono- or polyhydric phenols with aldehydes, in particular formaldehyde, in the presence of acid catalysts). The epoxide equivalent weights of these epoxide compounds (epoxy resins) are between 100 and 2000, preferably between 160 and 1500. Examples of polyhydric phenols which may be mentioned are: resorcinol, hydroquinone, 2,2-bis-(4-hydroxyphenyl)propane (bisphenol A), isomer mixtures of dihydroxydiphenylmethane (bisphenol F), tetrabromobisphenol A, 4,4'-dihydroxydiphenylcyclohexane, 4,4'-dihydroxy-3,3'-dimethyldiphenylpropane, 4,4'-dihydroxydiphenyl, 4,4'-dihydroxybenzophenone, bis-(4-hydroxyphenyl)-1,1-ethane, bis-(4-hydroxyphenyl)-1,1-isobutane, bis-(4-hydroxy-tert.-butylphenyl)-2,2-propane, bis-(2-hydroxynaphthyl)-methane, 1,5-dihydroxynaphthalene, tris-(4-hydroxyphenyl)-methane, bis-(4-hydroxyphenyl) ether, bis-(4-hydroxyphenyl) sulfone and the like, and the chlorination and bromination products of the above-mentioned compounds. Bisphenol A and bisphenol F are particularly preferred here.

The polyglycidyl ethers of polyhydric alcohols are also suitable. Examples which may be mentioned of such polyhydric alcohols are ethylene glycol, diethylene glycol, triethylene glycol, 1,2-propylene glycol, polyoxypropylene glycols (n=1-10), 1,3-propylene glycol, 1,4-butylene glycol, 1,5-pentanediol, 1,6-hexanediol, 1,2,6-hexanetriol, glycerol and bis-(4-hydroxycyclohexyl)-2,2-propane.

It is also possible to use polyglycidyl esters of polycarboxylic acids which are obtained by reaction of epichlorohydrin or similar epoxide compounds with an aliphatic, cycloaliphatic or aromatic polycarboxylic acid, such as oxalic acid, succinic acid, adipic acid, glutaric acid, phthalic acid, terephthalic acid, hexahydrophthalic acid, 2,6-naphthalenedicarboxylic acid and dimerized linolenic acid. Examples are diglycidyl adipate, diglycidyl phthalate and diglycidyl hexahydrophthalate.

These polyepoxide compounds can also be employed as a mixture with one another and if appropriate also as a mixture with monoepoxides. Examples of suitable monoepoxides are: epoxidized monounsaturated hydrocarbons (butylene oxide, cyclohexene oxide and styrene oxide) and halogen-containing epoxides, such as, for example, epichlorohydrin; epoxide ethers of monohydric alcohols (methyl, ethyl, butyl, 2-ethylhexyl and dodecyl alcohol); epoxide ethers of monohydric phenols (phenol, cresol and other phenols substituted in the o- or p-position); and glycidyl esters of saturated and unsaturated carboxylic acids.

Epoxides containing amide or urethane groups are furthermore suitable for the reaction, for example triglycidyl isocyanurate or hexamethylene diisocyanate masked with glycidol.

Other suitable epoxide compounds are derived from unsaturated fatty acids, for example from linoleic acids or linolenic acids. Suitable epoxidized fatty acid derivatives are, for example, those of linseed oil, soya oil, alkyl esters of castor oil or soya oil, linoleic fatty acid, oleic or arachidonic acid, oligomeric fatty acids and esters thereof, and epoxidized polyvalent alkyl esters are furthermore suitable. Epoxidized linseed oil and soya oil are preferred.

Mixtures of the epoxides mentioned can also be employed.

A detailed list of suitable epoxide compounds is to be found in the handbook "Epoxidverbindungen und Epoxidharze" (Epoxide Compounds and Epoxy Resins) by A. M. Paquin, Springer Verlag, Berlin 1958, Chapter IV, in Lee, Neville "Handbook of Epoxy Resins", 1967, Chapter 2, and Wagner/Sarx, "Lackkunstharze" (Synthetic Resins for Varnishes), Carl Hanser Verlag (1971), page 174 et seq.

Instead of the polyepoxide compound, reaction products thereof with $CO_2$ can also be employed. In addition to epoxide groups, these products also contain 1,3-dioxolan-2-one groups (cyclic carbonate groups), which can be reacted with primary amines to form urethanes. Depending on the molar ratios of polyepoxide compound and $CO_2$, the reaction with $CO_2$ gives compounds which no longer contain epoxide groups or compounds which contain epoxide groups and cyclic carbonate groups; in this context see DE Patent Applications P 36 44 372.7 and P 36 44 373.5.

The polyepoxide compounds or the compounds containing cyclic carbonate groups can be employed as such; however, it is often advantageous for some of the reactive epoxide groups/cyclic carbonate groups to be reacted with a modifying material in order to improve the film properties.

Plasticized epoxy resins having terminal epoxide groups which are prepared by partial reaction of the epoxide groups of epoxy resins containing at least two epoxide groups with OH- and COOH-containing substances, such as polyhydric alcohols, for example the abovementioned diols, polycarboxylic acids or polyesters containing carboxyl or OH groups, or by reaction with polyamines are particularly preferred.

Possible epoxides in the context of the present invention are also reaction products of compounds having at least two 1,2-epoxide groups per molecule and epoxide equivalent weights of 160 to 600 and aromatic dicarboxylic acids or mixtures thereof with compounds from the group comprising (cyclo)aliphatic dicarboxylic acids, monocarboxylic acids and/or monohydric phenols, and optionally cyclic anhydrides. Products of this type are described in EP-0,387,692, to which reference is made here. All the abovementioned epoxide compounds are possible for the preparation of these reaction products.

Aromatic dicarboxylic acids which are used are, for example: terephthalic acid, isophthalic acid, o-phthalic acid or various naphthalene-dicarboxylic acids, for example 2,6inaphthalenedicarboxylic acid. Terephthalic acid is particularly preferred here. Mixtures of the aromatic dicarboxylic acids can also be employed.

Other suitable aromatic carboxylic acids are those of the type

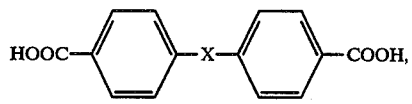

wherein X is a chemical bond, or is an alkylene radical having 1 to 6 carbon atoms, or is O or CO.

The term "(cyclo)aliphatic" dicarboxylic acids is intended to include corresponding aliphatic or cycloaliphatic acids and mixtures thereof.

Examples which may be mentioned of aliphatic dicarboxylic acids, the aliphatic radical of which in general contains 1 to 20, preferably 2 to 12, carbon atoms, are succinic acid, glutaric acid, adipic acid, suberic acid, azeleic acid, sebacic acid and dodecanedoic acid.

Suitable cycloaliphatic carboxylic acids, the cycloaliphatic radical of which usually comprises 5 to 12, preferably 6 to 8, carbon atoms, are, for example, the various cyclohexanedicarboxylic isomers, hexahydrophthalic acid and tetrahydrophthalic acid.

Suitable monocarboxylic acids, the carbon number of which is in general 3 to 20, preferably 3 to 12, are, for example: benzoic acid, α- and β-naphthoic acid, o-, m- and p-toluic acid, anisic acid and veratric acid; and furthermore branched or unbranched aliphatic monocarboxylic acids, such as, for example, acetic acid, propionic acid, butyric acid, lauric acid, stearic acid, isooctanoic acid or isononanoic acid, or hydroxymonocarboxylic acids, such as glycolic acid, lactic acid or dimethylolpropionic acid.

The monohydric phenols can be mono- or polynuclear. Examples which may be mentioned here are: phenol, o-, m- and p-cresol, xylenols, guaianol, thymol, carvacrol, α- or β-naphthyl, p-butylphenol and the like.

If the acid component is a mixture of an aromatic dicarboxylic acid with (cyclo)aliphatic dicarboxylic acids, monocarboxylic acids and/or aromatic alcohols, the amount of these constituents present alongside the aromatic dicarboxylic acid is usually 0.1 to 20% by weight, preferably 1 to 5% by weight, based on the aromatic dicarboxylic acid.

The epoxide and the acid components are usually employed in amounts such that the equivalent ratio of epoxide to carboxyl groups is 6:5 to 2:1, preferably 3:2 to 2:1. If cyclic anhydrides are also used, in general 0.01–1 mol, preferably 0.1–0.4 mol, of cyclic anhydride are used per mol of reaction product of epoxide and acid component.

Possible cyclic polycarboxylic anhydrides are advantageously those which contain 4 to 20, preferably 4 to 10, carbon atoms and which can optionally also carry substituents such as halogen, in particular chlorine, and carboxyl groups. They can be derived from (cyclo)aliphatic, olefinically unsaturated or aromatic polycarboxylic acids. Examples which may be mentioned here are: succinic anhydride, alkylenesuccinic anhydrides, such as, for example, dodecenylsuccinic anhydride, glutaric anhydride, maleic anhydride or citraconic anhydride.

The molecular weight (weight-average) of all the epoxides on which the coating agents according to the invention are based, determined by means of gel chromatography (polystyrene standard), is usually in the range from about 300 to about 50,000, preferably about 300 to about 20,000.

Before introduction of the acetoacetate groups, these epoxide compounds are reacted with water, with amines or with hydroxycarboxylic acids, so that a product which is largely free from epoxide groups is formed. This reaction is carried out at temperatures in the range from 30° to 140° C. in a solvent, such as, for example, xylene, toluene, limonene, butanol, diglycol dimethyl ether, methoxypropanol or butyl acetate. In the case of amines, the particular educts are reacted with one another in stoichiometric proportions, so that no free amine remains.

The following amines can be employed, for example, for the reaction with the epoxides; $C_1$ to $C_{10}$-dialkylamines having identical or different alkyl groups in the molecule, such as dimethyl-, diethyl-, diisopropyl- and dibutylamine and methylethyl-, methylpropyl- and methylbutylamine, monocycloaliphatic amines such as morpholine, piperidine and pyrrolidine, and/or monoalkanolamines, such as N-methylamino-ethanol, and/or dialkanolamines, such as diethanolamine or diisopropanolamine.

Examples which may be mentioned of suitable amines are: ethylamine, n-propylamine, isopropylamine, n-butylamine, sec.-butylamine, tert.-butylamine, n-pentylamine, n-hexylamine, α-methylbutylamine, n-ethylpropylamine, dimethylaminopropylamine, β-ethylbutylamine, n-methylbutylamine, benzylamine and cyclohexylamine, benzylamine, phenylethylamine, hexylamine, furfurylamine, propylamine and tert-butylamine. Suitable hydroxyamines are monohydroxyamines, such as 2-aminoethanol, 2-aminopropanol, 3-aminopropanol, 1-amino-2-propanol and 2-amino-3-pentanol, polyhydroxymonoamines, such as 2-amino-2-methyl-1,3-propanediol and 2-amino-2-ethyl-1,3-propanediol.

The polyamines which are also possible, in particular diamines, can contain primary and/or secondary amino groups. Examples of such polyamines are: ethylenediamine, 1,2-diaminopropane, 1,3-diaminopropane, 1,3-diaminobutane, 1,4-diaminobutane, 1-amino-3-methylaminopropane, 2-methylpentamethylenediamine, pentamethylenediamine, hexamethylenediamine, trimethylhexamethylenediamine, neopentyldiamine, octamethylenediamine and cycloaliphatic diamines, such as 1,2-, 1,3- or 1,4-cyclohexyldiamine; 4,4'-methylene-bis-cyclohexylamine, isophoronediamine, 4,4'-diamino-3,3'-dimethyl-dicyclohexylmethane, xylenediamine, diethylenetriamine and bishexamethylenetriamine. Isophoronediamine, hexamethylenediamine, m-xylylenediamine and trimethylhexamethylenediamine are particularly preferred. Mixtures of the amines can also be used.

The primary amines and also the polyamines are preferably reacted with linear diglycidyl compounds in order to lengthen the chain and to build up the molecular weight; diglycidyl compounds which are suitable for this are, for example, the diglycidyl ethers which are derived from bisphenol A or F or the corresponding epoxide compounds, which contain cyclic carbonate groups in some cases. The reaction of the amines with the epoxides is preferably carried out so that the reaction is quantitative in respect of the primary and secondary amino groups and predominantly tertiary amino groups, or in the case of the cyclic carbonates urethane groups, are formed.

The following hydroxycarboxylic acids can be employed: lactic acid, malic acid, tartaric acid, dimethylolpropionic acid, hydroxybenzoic acid, hydroxycaproic acid and glycolic acid.

The subsequent esterification of the hydroxyl groups of the epoxide-amine adduct or epoxide-water adduct to give acetoacetate is as a rule carried out by reaction with monomeric acetoacetic acid esters, such as, for example, methyl, ethyl or t-butylacetoacetate. The degree of esterification of the hydroxyl groups can be modified here within a wide range, depending on the desired properties of the end product.

The transesterification is carried out by heating the two components with one another at the boiling point while slowly distilling off the low-boiling alcohol which forms, if appropriate in vacuo.

For cost reasons, a stoichiometric and quantitative reaction in respects of the amount of acetoacetate will preferably be sought.

However, the hydroxyl groups can also be esterified with acetoacetate equivalents, such as, for example, diketene or 2,2,6-trimethyl-1,3-dioxin-4-one.

In this case, the reaction is carried out in solution or in bulk at temperatures between room temperature and 150° C., and if necessary an additional catalyst can also furthermore be used.

The binder component thus obtained in the form of the polymer containing acetoacetate groups is mixed with a hardener in the form of a blocked polyamine. The molar ratio of blocked polyamines to polymer containing acetoacetate groups here is 0.5:1.5, in particular 1 to 1.5:1.

Examples which may be mentioned of typical polyamines which can be used according to the invention as the second component in the form of their aldimines or ketamines are aliphatic, aromatic or cycloaliphatic amines having 2 to 10 primary and/or secondary amino groups, preferably 2–4 primary amino groups, and 2–200 carbon atoms.

Examples of suitable polyamines are ethylenediamine, propylenediamine, butylenediamine, pentaethylenediamine, 2-methylpentamethylenediamine, trimethylhexamethylenediamine, hexamethylenediamine, decamethylenediamine, 4,7-dioxadecane-1,10-diamine, dodecamethylenediamine, 4,9-dioxadodecane-1,12-diamine, 7-methyl-4,10-dioxatridecane-1,13-diamine, 1,2-diaminocyclohexane, 1,4-diaminocyclohexane, 4,4'-diaminodicyclohexyl-methane, isophoronediamine, bis(3-methyl-4-aminocyclohexyl)methane, 2,2-bis(4-aminocyclohexyl)propane, nitrile-tris(ethaneamine), bis(3-aminopropyl)methylamine, 3-amino-1-(methylamino)propane, 3-amino-1-(cyclohexylamino)propane, N-(2-hydroxyethyl)ethylene-diamine and polyamines of the formula $H_2N-(R_2-NH)_n-R_1-NH_2$, in which the group $R_1$ and the n groups $R_2$ are identical or different and are an alkylene group which contains 2–6, preferably 2–4, carbon atoms and n is a number from 1 to 16, preferably from 1 to 3. Alkyl group here is also understood as meaning a cycloalkyl group or an alkyl group containing an ether-oxygen atom. Examples of suitable polyalkylpolyamines are diethylenetriamine, dipropylenetriamine, dibutylenetriamine and bishexamethylenetriamine. These polyamines preferably contain 5–15 carbon atoms.

Other suitable polyamines according to the invention are the adducts of amino compounds or polyamines of the type described above onto a polyvalent epoxide, isocyanate, maleate or fumarate or onto an acryloyl compound or methacryloyl compound.

Examples which may be mentioned of suitable epoxide compounds, which can be solid or liquid, are the di- or polyglycidyl ethers of (cyclo)aliphatic or aromatic hydroxyl compounds, such as ethylene glycol, glycerol or cyclohexanediol (or the epoxides as mentioned above), and cycloaliphatic epoxide compounds, such as epoxidized styrene or divinylbenzene, which can be subsequently hydrogenated; glycidyl esters of fatty acids which contain, for example, 6–24 carbon atoms; glycidyl (meth)acrylate; epoxide compounds which contain an isocyanurate group; an epoxidized polyalkadiene, such as, for example, epoxidized polybutadiene; hydantoin epoxy resins; epoxy resins obtained by epoxidation of aliphatic and/or cycloaliphatic alkenes, such as, for example, dipentene dioxide, dicyclopentadiene dioxide and vinylcyclohexene dioxide, and resins containing glycidyl groups, for example polyesters or polyurethanes which contain one or more glycidyl groups per molecule, or mixtures of the epoxy resins described above. The epoxy resins are known to the expert and need not be described in more detail here.

The epoxy resins should preferably be a diglycidyl ether based on a bis(4-hydroxyphenyl)-2,2-propane. The preferred epoxide equivalent weight of the epoxy resins is in the range from 87–6000, preferably 120–1000.

Examples of suitable isocyanate compounds are: polyisocyanates, such as tetramethylene diisocyanate, hexamethylene diisocyanate, 2,2,4-trimethylhexamethylene diisocyanate, dodecane 1,12-diisocyanate, cyclohexane 1,3- and 1,4-diisocyanate 1-isocyanato-3,3,5-trimethyl-5-isocyanatomethylcyclohexane (=isophorone diisocyanate, IPDI), perhydro-diphenylmethane 2,4'- and/or 4,4'-diisocyanate, phenylene 1,3- and 1,4-diisocyanate, toluylene 2,4- and 2,6-diisocyanate, diphenylmethane 2,4'- and/or 4,4'-diisocyanate, 3,2'- and/or 3,4'-diisocyanato-4-methyl-diphenylmethane, naphthylene 1,5-diisocyanate, triphenylmethane 4,4',4''-triisocyanate or mixtures of these compounds.

In addition to these simple isocyanates, those which contain hetero atoms in the radical linking the isocyanate groups are also suitable. Examples of these are polyisocyanates containing carbodiimide groups, allophanate groups, isocyanurate groups, urethane groups, acylated urea groups and biuret groups.

Particularly suitable polyisocyanates are the known polyisocyanates which are chiefly employed in the preparation of varnishes, for example modification products, containing biuret, isocyanurate or urethane groups, of the abovementioned simple polyisocyanates, in particular tris-(6-isocyanatohexyl)-biuret or low molecular weight polyisocyanates which contain urethane groups, such as can be obtained by reaction of IPDI employed in excess with simple monohydric alcohols of the molecular weight range 62–300, in particular with trimethylolpropane. Any desired mixtures of the polyisocyanates mentioned can of course also be employed.

Suitable polyisocyanates are furthermore the known prepolymers containing terminal isocyanate groups, such as are accessible, in particular, by reaction of the abovementioned simple polyisocyanates, above all diisocyanates, with less than the equivalent amounts of organic compounds having at least two groups which are reactive towards isocyanate groups. Such compounds which can be used in particular are compounds containing a total of at least two amino groups and having a molecular weight in the range from 300 to 10,000, preferably 400 to 6000. The corresponding polyhydroxy compounds, for example the hydroxypolyesters, hydroxypolyethers and/or acrylate resins containing hydroxyl groups which are known per se in polyurethane chemistry, are preferably used.

The ratio of isocyanate groups to hydrogen atoms which are reactive towards NCO in these known prepolymers corresponds to 1.05 to 10:1, preferably 1.1 to 3:1, the hydrogen atoms preferably originating from hydroxyl groups.

Examples of suitable polyfunctional acryloyl compounds or methacryloyl compounds comprise the (meth)acrylic esters of di-, tri- or poly-hydroxy compounds, including polyester-diols or -polyols and polyether-diols or -polyols; adducts of a polyol (meth)acrylate containing hydroxyl groups on an at least bifunctional isocyanate compound or epoxide compound; and adducts of (meth)acrylic acids on an at least bifunctional compound. The compounds which are possible here are called poly(meth)acryloyl compounds here for short. Examples which may be mentioned of suitable (meth)acrylic esters of di-, tri- or polyhydroxy compounds are ethylene glycol, propylene glycol, diethylene glycol, tetramethylenediol, neopentylglycol, hexamethylenediol, cyclohexanediol, 4,4'-dihydroxybenzophenone, bis-(4-hydroxycyclohexane)methane, glycerol, trimethylolpropane and pentaerythritol. These esters preferably contain a hydroxyl group. The (meth)acrylic esters containing hydroxyl groups from which the adduct on the at least bifunctional isocyanate compound or epoxide compound can be formed are the polyol (meth)acrylates as already mentioned above. Examples which may be mentioned of an at least bifunctional isocyanate compound or epoxide compound which is suitable for formation of the abovementioned adduct are those isocyanate and epoxide compounds which have already been mentioned as a component for the adduct of an amino compound with a polyfunctional isocyanate compound or epoxide compound. The poly(meth)acryloyl compound usually has an equivalent weight of 85–5000, preferably 100–1000.

The amino groups of the polyamines described above are blocked by an aldehyde or ketone having not more than 18 carbon atoms, preferably 3–10 carbon atoms, for use in the coating agent according to the invention. Examples of suitable blocking reagents are acetone, diethyl ketone, methyl isopropyl ketone, diisobutyl ketone, methyl t-butyl ketone, methyl isobutyl ketone, methyl ethyl ketone, isobutyraldehyde, hydroxybutyraldehyde, pentanone, cyclohexanone, ethyl amyl ketone, hydroxy-citronellal, isophorone and decanone. An aliphatic or cycloaliphatic ketone having 3–12 carbon atoms should preferably be used. Blocking of the amino groups is known and need not be described in more detail. The blocked polyamines usually have an average molecular weight 250–4000, preferably 300–2000.

If appropriate, the hardenable liquid coating agents according to the invention can contain a diluent, such as customary inert organic solvents. Examples of these which may be mentioned are: halogenated hydrocarbons and ethers, such as diethyl ether, 1,2-dimethoxyethane, tetrahydrofuran or dioxane; ketones, such as, for example, methyl ethyl ketone, acetone, cyclohexanone and the like; alcohols, such as methanol, ethanol, propanol, butanol and benzyl alcohol, (cyclo)aliphatic and/or aromatic solvents in the boiling range from about 150° to 180° C. (higher-boiling mineral oil fractions, such as ®Solvesso), or esters, such as butyl acetate. The solvents can be employed here individually or as a mixture.

Customary additives which may possibly be present in the liquid coating agents according to the invention and may be mentioned here are—depending on the particular intended use—the customary varnish additives, such as pigments, pigment pastes, antioxidants, flow agents or thickeners, rheology auxiliaries, foam suppressants and/or wetting agents, fillers, catalysts, additional hardening agents and additional hardenable compounds and the like. If appropriate, these additives can be added to the mixture just immediately before processing.

Because of their favorable properties—above all the rapid hardening even at low temperatures—the mixtures according to the invention have diverse industrial uses, for example for the production of shaped articles (casting resins) for tool construction or for the production of coatings and/or intermediate coatings on many kinds of substrates, for example on those of an organic or inorganic nature, such as, for example, wood, textiles, plastics, glass, ceramic and building materials, but in particular on metal. The mixtures according to the invention can furthermore be employed as constituents of paints and varnishes for coating industrial objects, domestic appliances, such as, for example, refrigerators, washing machines and electrical appliances, windows and doors. They can be applied, for example, by brushing, atomizing, dipping, spraying and the like.

Varnish formulations are a preferred field of use for the mixtures according to the invention.

Hardening of the mixtures according to the invention proceeds very rapidly and in general takes place at −10° to 150° C., preferably 0° to 140° C.

The hardening reaction can be carried out in one stage, for example by using equivalent proportions of the components. The pot life and the properties of the product therefore depend on the process conditions, that is to say on the nature and amount of the starting substances, the temperature program and the like. The elasticity of the crosslinked product can thus be controlled within a tolerance range, for example by the chain length of the oligomers and/or polymers employed. Although hardening is as a rule carried out discontinuously, it is also within the context of the invention to carry out mixing of the components and the reaction continuously, for example by means of an automatic varnishing device.

Surprisingly, although they are comparable in their molecular weights and in their functionalities with the binders of EP 0,199,087 (the comparison example is Example G; $M_n$ 3400, EW 960, calculated functionality: 5.9), the binders described above surprisingly have a higher reactivity, which manifests itself in the shorter gelling time and in the better resistance to solvents. It is known from the literature (XIX Fatipec Congress, 1988 volume III, page 137 et seq.) that carboxylic acids accelerate the crosslinking reaction; it is therefore surprising that in the present case, although these binders contain amino groups which render the entire system more basic, an accelerated reaction is observed.

In addition, the resulting coatings are distinguished by better resistances to solvents (the varnish film can be after-worked earlier) and by higher elasticities (Erichsen indentation).

PREPARATION OF BINDER COMPONENT A

Example A1

110.6 parts of diethanolamine and 121.8 parts of limonene were heated to 110° C. under nitrogen in a 4 l four-necked flask fitted with a stirrer, thermometer, reflux condenser and dropping funnel. 987 parts of Beckopox EP 304 (tradename of Hoechst AG for a diglycidyl ether based on bisphenol A, epoxide content: about 1.8%) were then added in the course of 1 hour and the mixture was subsequently stirred until the epoxide content had fallen to <0.2%. After addition of 700 parts of ethyl acetoacetate, the mixture was heated under reflux for 3 hours. The volatile constituents were subsequently distilled off in the course of 3 hours, initially under normal pressure and then in vacuo, up to a bottom temperature of 145° C. The residue was diluted with butyl acetate to a solids content of 60%. This gives a yellow-brown resin solution having an acetoacetate content of 11.7%, an equivalent weight of about 870 g/mol and a molecular weight Mn of 3200. The calculated functionality of the binder is 6.2. (Calculated functionality = quotient of the $M_n$ and equivalent weight of the solid resin).

Example A2

55.5 parts of xylene, 34.8 parts of phthalic anhydride, 24.8 parts of adipic acid, 1.34 parts of trimethylolpropane and 49.4 parts of Cardura E 10 (tradename of SHELL for a versatic acid glycidyl ester) were heated at 120° C. for 2 hours in a 2 l four-necked flask which was fitted with a stirrer, thermometer, reflux condenser and dropping funnel. 111.6 g of Beckopox EP 140 (tradename of Hoechst AG for a diglycidyl ether based on bisphenol A, epoxide content: about 8.6%) were then added. The mixture was then subsequently stirred at 100°–120° C. until an acid number of <0.3 was reached.

After cooling to 100° C., 21 g of diethanolamine were then added dropwise in the course of 15 minutes; the mixture was then subsequently stirred at the same temperature until the epoxide content had fallen to <0.1%. After addition of 104 parts of t-butyl acetoacetate, the mixture was heated under reflux for 3 hours. The volatile constituents were subsequently distilled off in the course of 3 hours, initially under normal pressure and then in vacuo, up to a bottom temperature of 145° C. The residue was diluted with butyl acetate to a solids content of 60%. This gives a yellow-brown resin solution having an acetoacetate content of 12%, an equivalent weight of about 850 g/mol and a molecular weight $M_n$ of 2990. The calculated functionality of the binder is 5.9.

Example A3

60 parts of xylene, 35.5 parts of phthalic anhydride, 29.2 parts of adipic acid and 62.4 parts of Cardura E 10 (tradename of SHELL for a versatic acid glycidyl ester) were heated at 120° C. for 2 hours in a 2 l four-necked flask which was fitted with a stirrer, thermometer, reflux condenser and dropping funnel. 111.6 g of Beckopox EP 140 (tradename of Hoechst AG for a diglycidyl ether based on bisphenol A, epoxide content: about 8.6%) were then added. The mixture was then subsequently stirred at 100°–120° C. until an acid number of less <0.3 was reached.

After cooling to 100° C., 21 g of diethanolamine were then added dropwise in the course of 15 minutes; the mixture was then subsequently stirred at the same temperature until the epoxide content had fallen to <0.1%. After addition of 100 parts of t-butyl acetoacetate, the mixture was heated under reflux for 3 hours. The volatile constituents were subsequently distilled off in the course of 3 hours, initially under normal pressure and then in vacuo, up to a bottom temperature of 140° C. The residue was diluted with butyl acetate to a solids content of 60%. This gives a yellow-brown resin solution having an acetoacetate content of 10.6%, an equivalent weight of about 960 and an average molecular weight $M_n$ of 2480. The calculated functionality of the binder is 3.9.

Example A4

300 parts of Beckopox VEM 2489 (tradename of Hoechst AG for a modified epoxy resin, epoxide content about 2.1%) and 85 parts of limonene were heated to 110° C. under nitrogen in a 2 l four-necked flask which was fitted with a stirrer, thermometer, reflux condenser and dropping funnel.

42 parts of diethanolamine were then added in the course of 10 minutes, and the mixture was subsequently stirred until the epoxide content had fallen to <0.2%. After addition of 284 parts of t-butyl acetoacetate, the mixture was heated under reflux for 3 hours. The volatile constituents were subsequently distilled off in the course of 3 hours, initially under normal pressure and then in vacuo, up to a bottom temperature of 145° C. The residue was diluted with a mixture of butyl acetate/methoxypropyl acetate 4:1 to a solids content of 60%. This gives a yellow-brown resin solution having an acetoacetate content of 14.7%, an equivalent weight of about 690 g/mol and a molecular weight $M_n$ of 2490. The calculated functionality of the binder is 6.1.

Example A5

270 parts of an epoxy resin based on bisphenol A (epoxide content: 1.7%) were converted into an epoxy resin containing cyclic carbonate groups (residual epoxide content <0.1%) with carbon dioxide in 120 parts of diglycol dimethyl ether in accordance with EP 0,212,409. 70 parts of water and 0.3 part of sodium carbonate were then added to the resin solution thus obtained and the mixture was heated to 100° C. It was subsequently stirred until carbonyl vibration in the region of 1790 cm$^{-1}$ was no longer visible in the IR spectrum. After the solvent had been distilled off under a waterpump vacuum, 270 parts of ethyl acetoacetate and 0.4 parts of dibutyltin dilaurate were added to the residue and the mixture was heated under reflux for 3 hours. The volatile constituents were subsequently distilled off in the course of 3 hours, initially under normal pressure and then in vacuo, up to a bottom temperature of 145° C. The residue was diluted with 210 parts of butyl acetate to a solid content of 60%. This gives a brown resin solution having an acetoacetate content of 8.7%, an equivalent weight of about 1030 g/mol and a molecular weight M$_n$ of 3200.

PREPARATION OF HARDENER COMPONENT B

Example B1

206 parts of diethylenetriamine, 440 parts of methyl isobutyl ketone, 162 parts of xylene and 2.6 parts of formic acid were heated under reflux in a 2 1 four-necked flask which was fitted with a reflux condenser, stirrer and water separator. After about 72 ml of water had been separated off, the mixture was cooled to 85° C. and 397 parts of Beckopox EP 104 (tradename of Hoechst AG for a diglycidyl ether based on bisphenol A, epoxide content: about 8.6%) were added in the course of 30 minutes. When an epoxide content of <0.5% had been reached, the mixture was adjusted to a solids content of 75% with 99 parts of xylene. This gives a pale yellow resin solution which has a viscosity of 620 mPas and an amine content of 6.9%.

PREPARATION OF THE PRIMING VARNISH

In accordance with the proportions in the following table, the binders according to the invention and a comparison binder from EP 0,199,087 were mixed with the pigment mixture, the additives and the solvent and the mixtures were ground.

Bentone 10% is a suspension in xylene; Additol XL 270 is a tradename of Hoechst AG for a commercially available antisedimentation agent.

The comparison example corresponds to Example G from EP 0,199,087.

Processing

The stated amount of hardener was added to 100 parts of the above varnish and the mixture was diluted with butyl acetate to spraying viscosity. The ready-to-spray varnish thus obtained was applied to degreased and cleaned test metal sheets; one half of the test metal sheet was pretreated with a commercially available primer before the application. After drying at room temperature, the sandability and the resistance to petrol and butyl acetate were tested after 4 hours.

Technological testing and comparison

| | Examples | | | | |
|---|---|---|---|---|---|
| | 1 (parts) | 2 (parts) | 3 (parts) | 4 (parts) | 5 (parts) |
| Binder component | | | | | |
| A1 | 125 | | | | |
| A2 | | 125 | | | |
| A3 | | | 125 | | |
| A4 | | | | 125 | |
| From example G of EPO 199087 | | | | | 125 |
| Pigment mixture + Bentone | 300 | 300 | 300 | 300 | 300 |
| (10% in xylene) | 17.5 | 17.5 | 17.5 | 17.5 | 17.5 |
| Additol XL 270 | 3.5 | 3.5 | 3.5 | 3.5 | 3.5 |
| Butyl acetate | 155 | 155 | 155 | 155 | 155 |
| Hardener B1/ 100 varnish | 7 | 7.1 | 6.3 | 8.5 | 6.3 | each containing 100 parts of kaolin, 100 parts of blanc fixe, 500 parts of TiO$_2$ (rutile) and 50 parts of talcum powder.

Results:

| | 1 | 2 | 3 | 4 | 5 |
|---|---|---|---|---|---|
| Gelling time (minutes): | 60 | 65 | 65 | 60 | 120 |
| Sandability: | 1 | 1–2 | 1 | 1 | 2 |
| Resistance* to Petrol** after 4 hours: | 0 | 1 | 0–1 | 0–1 | 3 |
| Butyl acetate** after 4 hours: | 1 | 1 | 1 | 1 | 4 |
| Distilled water*** after 10 days: | 1 | 1 | 1 | 1 | 1 |
| 10% strength sodium hydroxide solution*** after 10 days: | 1 | 1 | 1 | 1 | 1 |
| Erichsen indentation (mm) | | | | | |
| without | 7.5 | 6.8 | 7.2 | 7 | 2.5 |
| with | 8.5 | 7.4 | 8 | 7.8 | 3 |

*visual evaluation, 0 = very good
**action time 30 seconds
***action time 12 hours
without: The varnish was sprayed onto degreased and abraded bright metal sheets
with: The bright metal sheet was additionally pre-treated with a commercially available primer.

We claim:
1. Liquid coating composition comprising
   1) a reaction product of a polyepoxide and a reactant selected from water or an amine or a hydroxycarboxylic acid, said reaction product containing less than 0.2% of epoxide groups, which reaction produce is subsequently esterified or transesterified with acetoacetic acid and
   2) a polyamine in the form of its corresponding aldimine or ketimine.
2. In a method of coating a substrate, the improvement comprising using as the coating agent a composition of claim 1.
3. The liquid coating composition as claimed in claim 1, wherein said polyepoxide is based on bisphenol A and/or bisphenol F.
4. The liquid coating composition as claimed in claim 1, wherein said polyepoxide also contains dioxolan-2-one groups, in addition to epoxide groups.
5. The liquid coating composition as claimed in claim 1, wherein said polyepoxide is partly modified with polyalcohols, polycarboxylic acids or polyamines.
6. The liquid coating composition as claimed in claim 1, wherein said polyepoxide is based on bisphenol A and/or bisphenol F and is partly modified with polyalcohols, polycarboxylic acids or polyamines.
7. The liquid coating composition as claimed in claim 1, wherein said polyepoxide has a weight average molecular weight of 300 to 20,000.
8. The liquid coating composition as claimed in claim 1, wherein said reaction product is a polymer obtained by reaction of a polyepoxide based on bisphenol A and/or bisphenol F with a dialkanolamine.

9. The liquid coating composition as claimed in claim 1, wherein the polyamine, in the form of its corresponding aldimine or ketimine, is a reaction product of a polyamine with a polyepoxide or a polyisocyanate.

10. The liquid coating composition as claimed in claim 1, wherein the polyamine, in the form of its corresponding aldimine or ketimine, is a reaction product of a polyamine with a polyepoxide based on bisphenol A and/or bisphenol F.

11. The liquid coating composition as claimed in claim 1, wherein the polyamine, in the form of its corresponding aldimine or ketimine, is a compound of the formula $$H_2N-(R_2NH)_n-R_1-NH_2$$

in which $R_1$ and $R_2$ are identical or different and are $C_2$-$C_6$-alkyl and n is a number from 1 to 16.

12. In a method of filling automobile repairs with a two component composition or coating with a two component primer composition, the improvement comprising using a composition of claim 1 as one of the two components.

* * * * *